(12) United States Patent
Burgess

(10) Patent No.: US 7,555,864 B2
(45) Date of Patent: *Jul. 7, 2009

(54) JAPANESE KNOTWEED INJECTOR SYSTEM

(76) Inventor: Phillip Burgess, 28507 NE. 74th Ct., Battle Ground, WA (US) 98604

( * ) Notice: Subject to any disclaimer, the term of this patent is extended or adjusted under 35 U.S.C. 154(b) by 0 days.

This patent is subject to a terminal disclaimer.

(21) Appl. No.: 11/516,887

(22) Filed: Sep. 5, 2006

(65) Prior Publication Data

US 2007/0033870 A1    Feb. 15, 2007

Related U.S. Application Data

(63) Continuation-in-part of application No. 10/464,200, filed on Jun. 18, 2003, now Pat. No. 7,165,357.

(51) Int. Cl.
*A01G 29/00* (2006.01)
(52) U.S. Cl. .................................... 47/57.5
(58) Field of Classification Search ................. 47/57.5; 8/402; 427/291
See application file for complete search history.

(56) References Cited

U.S. PATENT DOCUMENTS

| | | | | |
|---|---|---|---|---|
| 2,116,591 A | * | 5/1938 | Barber | 47/57.5 |
| 2,290,363 A | * | 7/1942 | Stirton | 222/282 |
| 2,789,396 A | | 4/1957 | Jernander et al. | |
| 2,846,817 A | * | 8/1958 | Haislet | 47/57.5 |
| 2,885,121 A | * | 5/1959 | Littleton | 222/162 |
| 2,889,084 A | | 6/1959 | Tour | |
| 3,082,681 A | * | 3/1963 | Petersen | 99/532 |
| 3,353,537 A | | 11/1967 | Knox et al. | |
| 3,483,810 A | * | 12/1969 | Peters et al. | 99/532 |
| 3,530,785 A | * | 9/1970 | Peters et al. | 99/532 |
| 3,565,298 A | | 2/1971 | Ohlin et al. | |
| 3,604,592 A | | 9/1971 | Bacon et al. | |
| 3,945,571 A | | 3/1976 | Rash | |
| 4,826,050 A | | 5/1989 | Murphy et al. | |
| 5,031,357 A | * | 7/1991 | Macbeth | 47/57.5 |

(Continued)

FOREIGN PATENT DOCUMENTS

GB    2231763 A  * 11/1990

(Continued)

OTHER PUBLICATIONS

Controlling Britain's most pernicious plant—Japanese Knotweed, http://www.nationaltrust.org.uk/environment/html/nat_con/papers/plant01.htm [retrieved from internet Oct. 24, 2007] Sep. 2000, internet date back to Nov. 5, 2002, 3 pages.*

*Primary Examiner*—Son T. Nguyen
(74) *Attorney, Agent, or Firm*—Rylander & Associates P.C.; Kurt M. Rylander; Mark E. Beatty

(57) ABSTRACT

A Japanese knotweed injector system for injecting a dose of weed-killing fluid into the stem of a Japanese knotweed, including a fluid dispenser system with a fluid passage, a collared needle with a fluid delivery aperture in communication with the fluid dispenser system, and an actuator connected to the fluid dispenser system for actuating the transmission of fluid from the fluid dispenser system to the fluid delivery aperture. A Japanese knotweed injector system for use with several different needle profiles using interchangeable connectors.

12 Claims, 5 Drawing Sheets

U.S. PATENT DOCUMENTS

| | | |
|---|---|---|
| 5,181,636 A | 1/1993 | Anderson et al. |
| 5,216,833 A | 6/1993 | Longer |
| 5,239,773 A * | 8/1993 | Doolittle, Jr. ................. 47/57.5 |
| 5,797,215 A * | 8/1998 | Doolittle et al. .............. 47/57.5 |
| 5,934,510 A | 8/1999 | Anderson |
| 6,152,333 A | 11/2000 | Binder |
| 6,372,690 B1 | 4/2002 | Gregoire et al. |
| 6,484,440 B2 * | 11/2002 | Brown ........................ 47/57.5 |
| 2002/0046486 A1 * | 4/2002 | Wild et al. ................... 47/57.5 |
| 2004/0079169 A1 * | 4/2004 | Wild et al. .................... 73/861 |

FOREIGN PATENT DOCUMENTS

GB        2384158 A    *    7/2003

* cited by examiner

JAPANESE KNOTWEED INJECTOR SYSTEM

CROSS REFERENCE TO RELATED APPLICATION

This continuation-in-part application claims the benefit of priority to U.S. application Ser. No. 10/464,200 filed Jun. 18, 2003 now U.S. Pat. No. 7,165,357.

FIELD OF THE INVENTION

The present invention relates to apparatuses for the control of weeds. More particularly, the present invention relates to apparatus used to control the spread of Japanese knotweed by injecting herbicide into the stem cavities of Japanese knotweed plants.

BACKGROUND

Japanese knotweed is a prevalent and noxious weed. It ranges from Alaska to California east through most of the upper Midwest, and has heavily infested the northeast region of the United States and areas of the south and southeast. Japanese knotweed is found in natural areas, parks, gravel bars, and along riverbeds and stream banks, rights-of-way, and roadsides. It is also found in riparian areas and upland sites. Japanese knotweed thrives in moist soils, or where roots are able to grow into most soils. Plants often become established after being discarded from cultivated gardens, or as escapes from abandoned home sites. The spread of Japanese knotweed also occurs from mechanical mowing and the unintentional transport of cut rhizome segments into neighboring landscapes.

Japanese knotweed, a member of the buckwheat family (Polygonacaea) is an upright, herbaceous, shrub-like perennial that often grows to heights in excess of ten feet. As with all members of this family, the base of the stem above each joint is surrounded by a membranous sheath. Stems of Japanese knotweed are smooth (bamboo-like), stout, and swollen at the joints where the leaf joins the stem. Although leaf size varies depending upon environment conditions, age, and other factors, they are normally about six inches (152.4 mm) long, and three to four inches (76.2 to 101.6 mm) wide, broadly oval to somewhat triangular, mostly pointed at the tip, and are alternate on the stems. The stems are hollow, but may be water-filled depending upon soil moisture levels and where it is growing. The lower one to two nodes may often be full of water. The small, pale greenish-white flowers occur in attractive, branched sprays in summer and are followed by small winged fruits. When they appear, seeds are triangular, shiny, very small about 1/10 inch (2.54 mm) long. Seed may not be borne under all growing situations, and normally not under conditions found outside the native range of Asia. Plants grow quickly and often form large thickets or patches. The roots are rhizomes that may extend 30 feet (914.4 cm) in length. Buds along the length of rhizomes may develop into new stems depending upon environmental and cultural conditions. Digging around the base of established plants encourages new vegetative buds to develop along the rhizome system.

Japanese knotweed is able to spread by sprouts from rhizomes of established plants and from sprouts arising from stems that have been severed from the mother plant. Roots and stems are able to develop when stem nodes come in contact with soils that support plant establishment.

Known methods of Japanese knotweed control include foliar application. Foliar Applications are those applications made with spray equipment designed to apply small droplets over the entire plant (stems and leaves). These may be made with backpack applicators or hose-end sprayers. Applicators should use care to treat only the target species, and not desirable neighboring vegetation. Foliar applications on new growth from rhizome segments and cane nodes, have been found to be effective on plants within the first 3 to 4 weeks of growth (Less than 4 feet (121.92 cm) in height). On established root wads, the spraying of new growth may take several applications over several years to achieve control. It is not recommended in riparian areas. Depending upon size of infestation, foliar applications may require re-treatment during the growing season and possible follow-up treatment in successive years.

Another known Japanese knotweed control method is cut stem applications. Cut stem applications are made by cutting the Japanese knotweed stem between the first and second internode, and delivering into the "well" created by cutting the internode in half. Approximately 10-20 mL are delivered into the well using this method. Depending upon the site, several herbicide options exist for this application method. Cut stem applications have proven to be about 95% effective on mature plants. After regrowth to 4 feet (121.92 cm) on remaining stems a second cut stem or injection application should remove any regrowth.

Another known method of Japanese knotweed control is stem injection applications. Stem injection applications are those applications made just below the first or second node near the ground. Typically, a Japanese knotweed probe is used to create a small opening on either side of the stem just below the node allowing water to escape. A syringe metered to inject 5 mL of herbicide treatment delivers the treatment dose on a downward diagonal through one of the two holes closest to the applicator. The second hole then may allow pressurized water to escape if the node is full of water. Plants will normally take up herbicide within 20 minutes of injections.

The injection process in riparian areas has been the most effective against plant regrowth, as well as selective to the Japanese knotweed and posed no threat to the environment. Observed results of injections into each cane snowed total control with no regrowth occurring following treatment for 22 months. Each cane must be injected. Each cane has its own separate rhizome system. Even though the injection process is initially time consuming, it is more cost effective than several trips to the same site for foliar applications made over the years with minimum results. Late in the growing season the stalks tend to become tougher, requiring a sharper and more robust device for penetrating into the cane cavity.

The following represents a list of known related art:

| Reference: | Issued to: | Date of Issue: |
|---|---|---|
| U.S. Pat. No. 6,372,690 | Gregoire, et al. | Apr. 16, 2002 |
| U.S. Pat. No. 6,152,333 | Binder | Nov. 28, 2000 |
| U.S. Pat. No. 5934,510 | Anderson | Aug. 10, 1999 |
| U.S. Pat. No. 5,216,833 | Longer | Jun. 8, 1993 |
| U.S. Pat. No. 5,181,636 | Anderson, et al. | Jan. 26, 1993 |
| U.S. Pat. No. 4,826,050 | Murphy, et al. | May 2, 1989 |
| U.S. Pat. No. 3,945,571 | Rash | Mar. 23, 1976 |
| U.S. Pat. No. 3,604,592 | Bacon, et al. | Sep. 14, 1971 |
| U.S. Pat. No. 3,565,298 | Ohlin, et al. | Feb. 23, 1971 |
| U.S. Pat. No. 3,353,537 | Knox, et al. | Nov. 21, 1967 |
| U.S. Pat. No. 2,889,084 | Tour | Jun. 2, 1959 |
| U.S. Pat. No. 2,789,396 | Jernander, et al. | Apr. 23, 1957 |

The teachings of each of the above-listed citations (which does not itself incorporate essential material by reference) are herein incorporated by reference. None of the above inventions and patents, taken either singularly or in combination, is seen to describe the instant invention as claimed.

SUMMARY

A Japanese knotweed injector system for injecting a dose of weed-killing fluid into the stem of a Japanese knotweed, including a fluid dispenser system with a fluid passage, a collared needle with a fluid delivery aperture in communication with the fluid dispenser system, and an actuator connected to the fluid dispenser system for actuating the transmission of fluid from the fluid dispenser system to the fluid delivery aperture.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figures 1, 2:
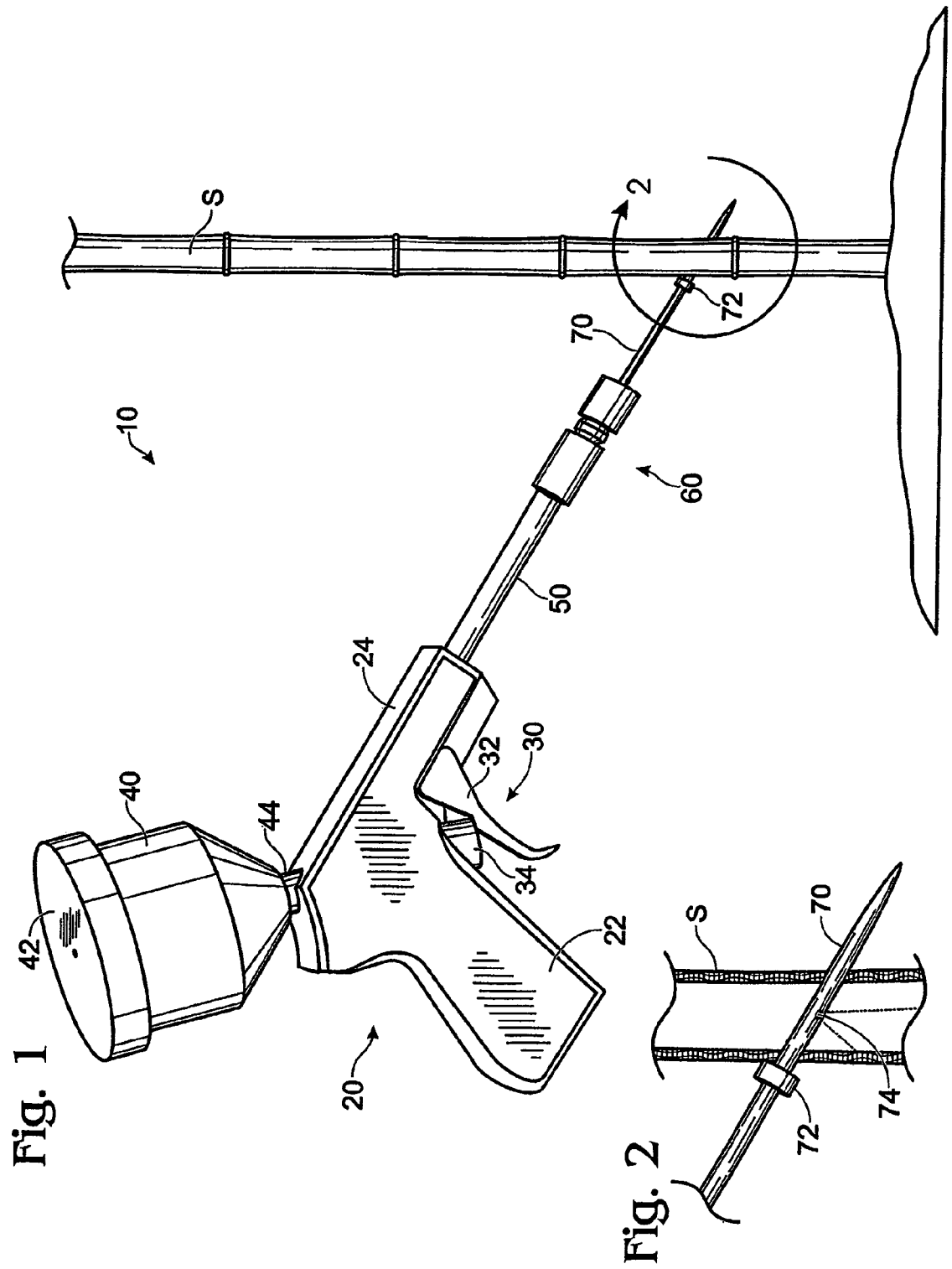
FIG. 1 is a perspective view of a first embodiment of the present invention.
FIG. 2 is an enlarged view of FIG. 1 showing a close up of the injector system impaled within the Japanese knotweed stem to deliver the weed-killing fluid.
Figure 3:
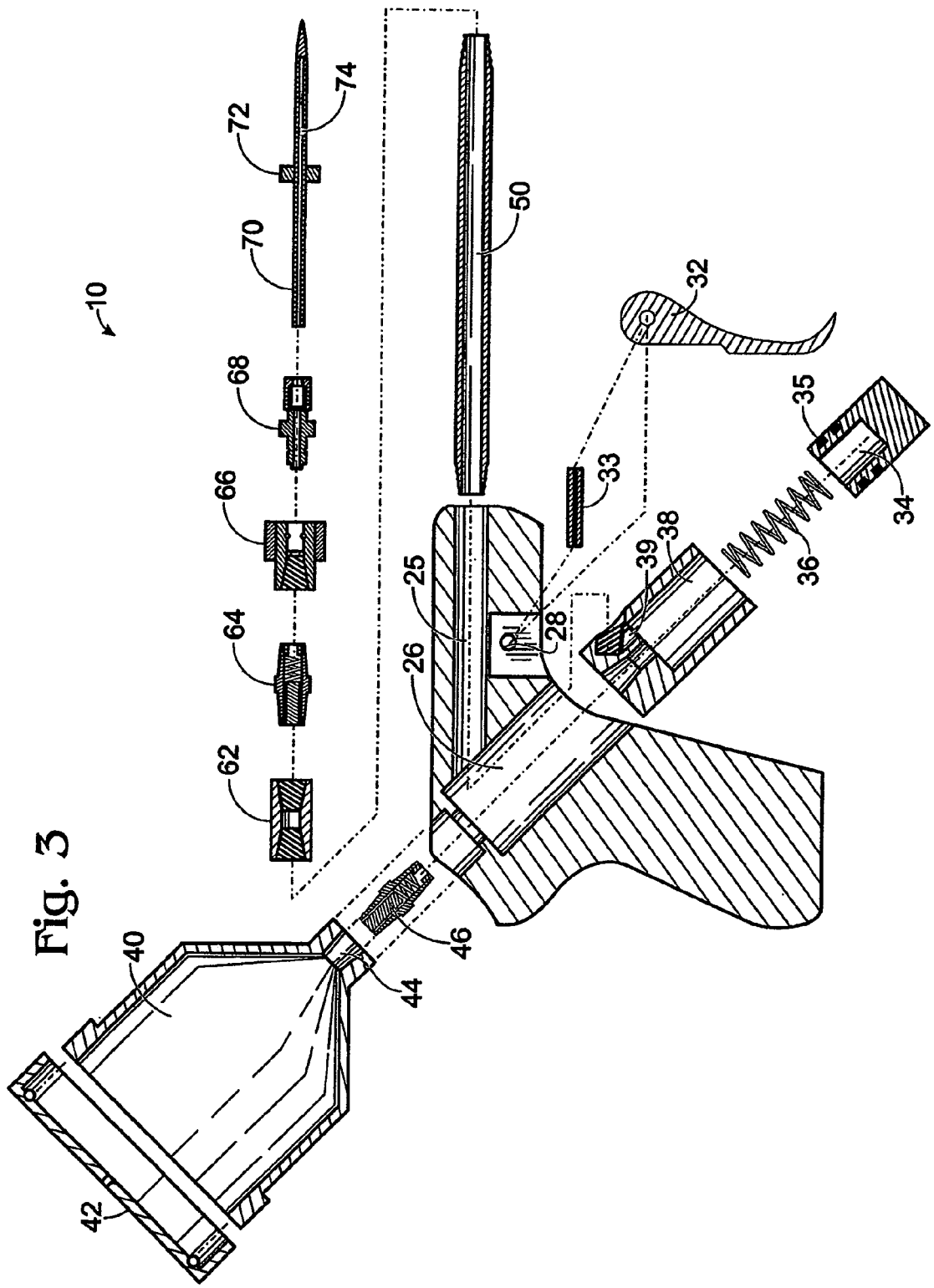
FIG. 3 shows an exploded sectional view of the injector system.

As shown in FIGS. 1, 2, and 3, an injector system is provided for the delivery of a dose of weed-killing fluid specific to Japanese knotweed. As shown in FIGS. 1, 2, and 3, the injector system comprises a collared needle with a fluid delivery aperture, a fluid dispenser and a fluid passage, and an actuator means for actuating the injection. FIG. 1 illustrates a perspective view of the injector system generally represented by reference numeral 10.

Referring to FIGS. 1 and 3, in a first embodiment the injector system 10 is provided with a pistol 20 as a pneumatic delivery means for injecting fluid into flora. The pistol includes a handle 22 and a barrel 24. Inside the barrel 24 is an injection chamber 25. The pistol 20 also contains a piston chamber 26 and trigger aperture 28.

The means for actuating the injection of the lethal dose of fluid in the preferred embodiment is provided by a trigger assembly 30. As shown in FIGS. 1 and 3, the trigger assembly 30 includes a trigger 32 and a steel trigger-retaining pin 33. The trigger 32 and trigger-retaining pin 33 are attached to the pistol through the trigger aperture 28. A piston 34 delivers the fluid. The piston 34 is sealed within the piston chamber 26 by double rubber Quad rings 35. A stainless steel spring 36 is provided as the biasing means. A stainless steel dispenser 38 is used to chamber the dosage fluid upon injection. The trigger assembly 30 is corrosion resistant and made to withstand use in harsh environments. Preferably, the fluid dosage is 5 mL. In the preferred embodiment, the dispenser 38 is a 5 mL dispenser, and the piston 34 is .0875 caliber with a 0.500 inch (12.7 mm) stroke.

As shown in FIGS. 1 and 3 a fluid reservoir 40, preferably 8 ounces (240 mL), is coupled to the dispenser 38. The reservoir 40 allows the injector system 10 to make repeated injections without having to reload. After the dose is delivered to the Japanese knotweed from the dispenser 38 upon actuation of the trigger, the stored fluid in the reservoir 40 flows through a column 44 and a reservoir check valve 46 that is threaded to coaxially receive the dispenser 38 to effectuate a dosage reload. This establishes the correct volume dosage for each injection. Once the reservoir 40 runs dry, more fluid may be added and injections may resume at the preferred dosage. A lid 42 is also included for easy refill.

In the preferred embodiment, the dispenser 38 communicates through a passage 39 with the injection chamber 25 by action of the reservoir check valve 46. The check valve 46 inhibits the dose from returning back to the dispenser 38 and from returning back to the reservoir 40, thereby forcing the fluid to inject through the injection chamber 25. As the dose is urged out of the dispenser 38 by means of the spring 36, pressure within the dispenser 38 permits dose to pass to the injection chamber 25 and eventually into the Japanese knotweed.

After leaving the dispenser 38, the fluid travels through a fluid passage which is a combination of the extension tube 50, coupling 60 and needle 70 in order to be expelled from the injector system 10 into the plant stem S.

As shown in FIG. 3 the extension tube 50 is threaded to coaxially receive the injection chamber 25 in the barrel 24. The extension tube 50 is preferably 6 inches (152.4 mm) in length and manufactured from brass with a ⅛ inch (3.175 mm) inner diameter.

In the preferred embodiment, the injector system 10 includes a brass and steel coupling 60 that connects the extension tube 50 to the injection needle 70. The coupling 60 is a series of threaded coaxial connects and disconnects. The coupling 60 includes a tube connector 62 threaded to receive the extension tube 50, a coupling check valve 64 threaded to receive the tube connector 62, a fastener 66 threaded to receive the coupling check valve 64, and a needle connector 68 threaded to receive the fastener 66.

As shown in FIG. 2, the injector system 10 comprises an injection needle 70. The stainless steel needle 70 is substantially sharp and strong to impale Japanese knotweed stems S having an average stem size less than 1.5 inches (38.1 mm) in diameter and a wall thickness of about 0.100 inches (2.54 mm). The needle 70 includes a collar 72 and a fluid delivery aperture 74. The collar 72 provides a substantially annular surface for abutting the outside surface of the stem S. The collar 72 acts as a stop for preferably positioning the needle 70 and fluid delivery aperture 74 for delivery of the weed-killing fluid. The fluid delivery aperture 74 is preferably 0.030 inches (0.762 mm) in diameter. The fluid delivery aperture 74 is disposed in the range of 0.3500 inches (8.88 mm) and 0.4500 inches (11.43 mm) distally from the collar 72, preferably 0.400 inches (10.16 mm). The distance between the collar 72 and the fluid delivery aperture 74 is integral in facilitating the proper delivery of the fluid into the Japanese knotweed due to the average thickness of the knotweed stem walls and the hollow core. In the preferred embodiment, the needle 70 is threaded to connect to the needle connector 68.

Those skilled in the art will know that there are a number of substantially similar ways in which to connect the needle 70 to the fluid dispenser 38. For example, in one alternative embodiment, the needle 70 connects directly to the injection chamber 25.

In operation the reservoir 40 is filled with known weed-killing fluid, such as herbicides. The reservoir check valve 46 then allows 5 mL of the fluid to fill the dispenser 38. The injector system 10 is now ready for use and may be engaged with a stem S of the Japanese knotweed.

During the operation of the injector system 10 it is necessary that the injected dose be supplied to the stem S with the proper depth of penetration. FIG. 1 shows the needle 70 having been penetrated completely through the stem S of the Japanese knotweed so that the needle 70 impales the stem S of the plant. The collar 72 stops the depth of the penetration at the correct position along the length of the needle 70 so that the injection of the fluid through the delivery aperture 74 occurs in the core of the Japanese knotweed, between the stem walls. This provides for the most efficient application of a lethal dosage of weed killer for Japanese knotweed species.

Once the needle 70 has been inserted into the stem S to the collar 72, the injection may be actuated by manually operating the trigger 32 of the pistol 20. Upon activation of the trigger 32, a rapid momentary movement of the piston 34 elevates the pressure in the dispenser 38 causing the dosage fluid to inject through the injection chamber 25, through the extension tube 50, through the coupling 60 and out the fluid delivery aperture 74 of the injection needle 70 and into the Japanese knotweed.

After the dispenser 38 is emptied, the reservoir check valve 46 allows more fluid from the reservoir 40 to pass into the dispenser chamber 38. Each injection stages an additional injection until the reservoir 40 runs empty. A number of Japanese knotweed plants may be injected in this regard allowing for efficiency and ease of delivery.

Figure 4:
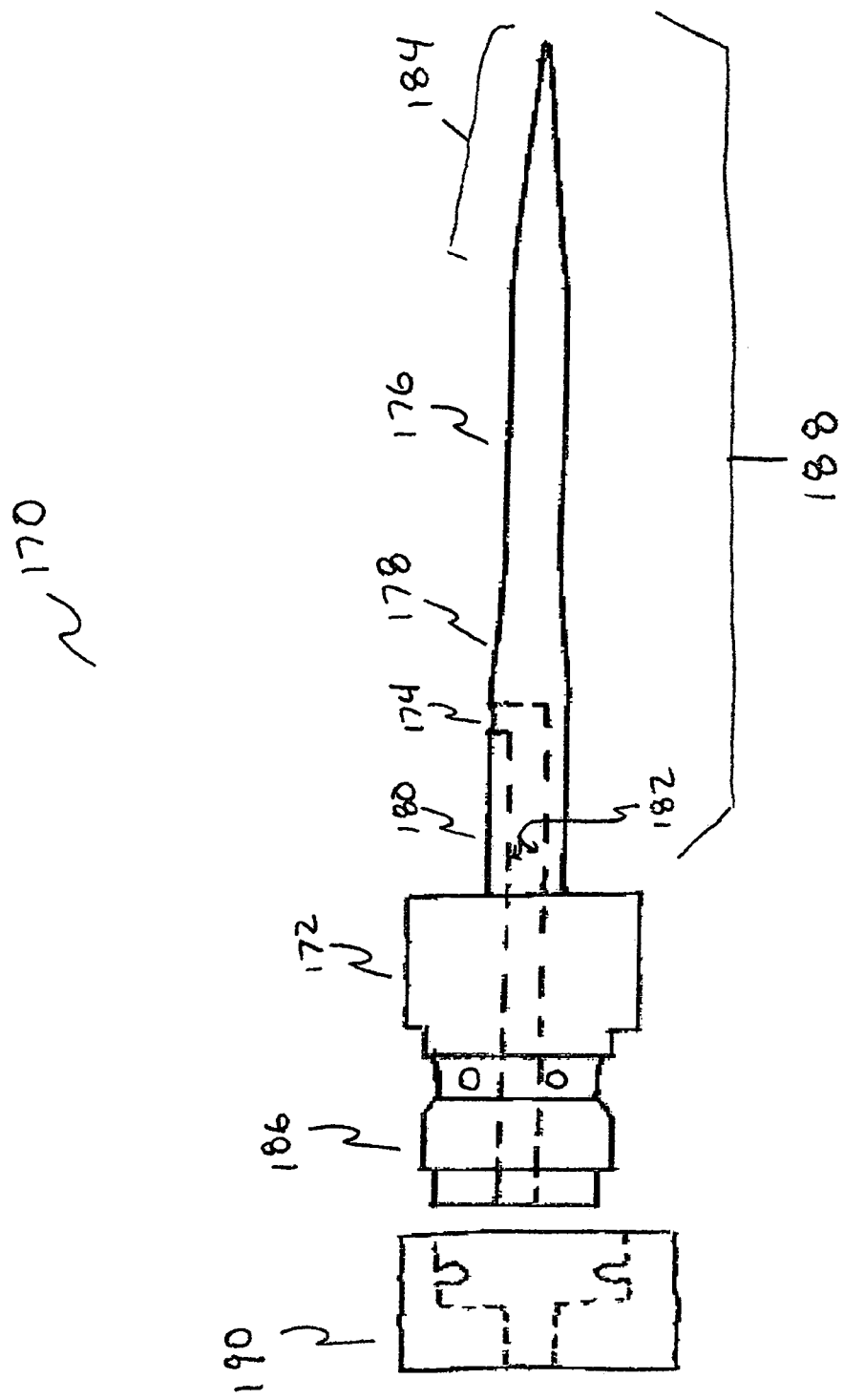
FIG. 4 shows a view of a second embodiment of an injector needle.

A second embodiment showing a different injector needle profile is shown by reference to FIGS. 1 and 4. A second embodiment includes a collared needle 170 with a quick connect coupling male end 186, a fluid delivery aperture 174 in communication with a fluid dispensing system (not shown) through channel 182 and quick connector 186, a penetrator 188, and an annular collar 172 surrounding the base of penetrator 170.

Penetrator 188 includes a highly tapered blunted tip 184, a shaft extension 176 with constant cross-section, a tapered shoulder 178, and a base 180 with constant cross section. Blunting tip 184 with a radius reduces wear and reduces risk of splitting the knotweed cane during penetration, which would allow herbicide to leak out of the cane cavity. Base 180 is connected to and extends from quick connect 186. Tapered shoulder 178 extends from base 180. Shaft extension 176 extends from tapered shoulder 178; and, tip 184 extends from shaft extension 176. Fluid delivery aperture 174 is located along penetrator base 184 distal from collar 172, and distal from tip 184. Fluid delivery aperture 174 is located distally from annular collar 172, in the range of 0.3500 inches (8.88 mm) and 0.4500 inches (11.43 mm), preferably approximately 0.400 inches (10.16 mm) and close to tapered shoulder 178.

Collared needle 170 may be used with fluid dispenser 20 by replacing threaded coupling 60 with a corresponding quick connect coupler, rigidly fixing female quick connector 190 to extension tube 50. The male end 186 of the quick connect coupler preferably forms a unitary piece with collar 172 and penetrator 188 for improved strength, formed by orbitally welding male end 186 to collar 172, and orbitally welding collar 172 to penetrator 188. Alternatively, male end 186, collar 172, and penetrator 188 may be extruded, pressed, or stamped from a single piece of material. Coupler 186 and 190, collar 172, and penetrator 188 are preferably formed from stainless steel for corrosion resistance and strength, but other grades or alloys of stainless steel may be used. 17-4PH stainless steel is preferred for greater hardness. Tungsten steel or "tool steel" may also be used but is less preferable because it is more susceptable to wear and corrosion. Another alternative connection method is to provide threaded connections, which allows dissimilar materials to be used for needle 170 and coupler 60, such as stainless steel and brass respectively.

Quick connect couplers 186 and 190 may be any standard quick connect couplers of appropriate size, but preferably include corresponding indents and detents to prevent needle 170 from rotating in relation to injector 20 during impalement or removal. Eliminating relative rotation allows the operator to use greater force with a back-and-forth twisting movement during impalement where a knotweed cane is particularly tough or needle 170 has become dull with use. Use of non-rotating quick connectors eliminates the possibility of needle 170 backing out of threaded couplings.

The cross section of penetrator 188 may be circular, oval, or may incorporate one or more flat edges including a polygonal shape such as triangular. Flat edges can be less expensive to manufacture and maintain, and may aid penetration because sharpening these edges creates new cutting surfaces, but care must be taken as this could also cause the cane to split.

Figure 5:
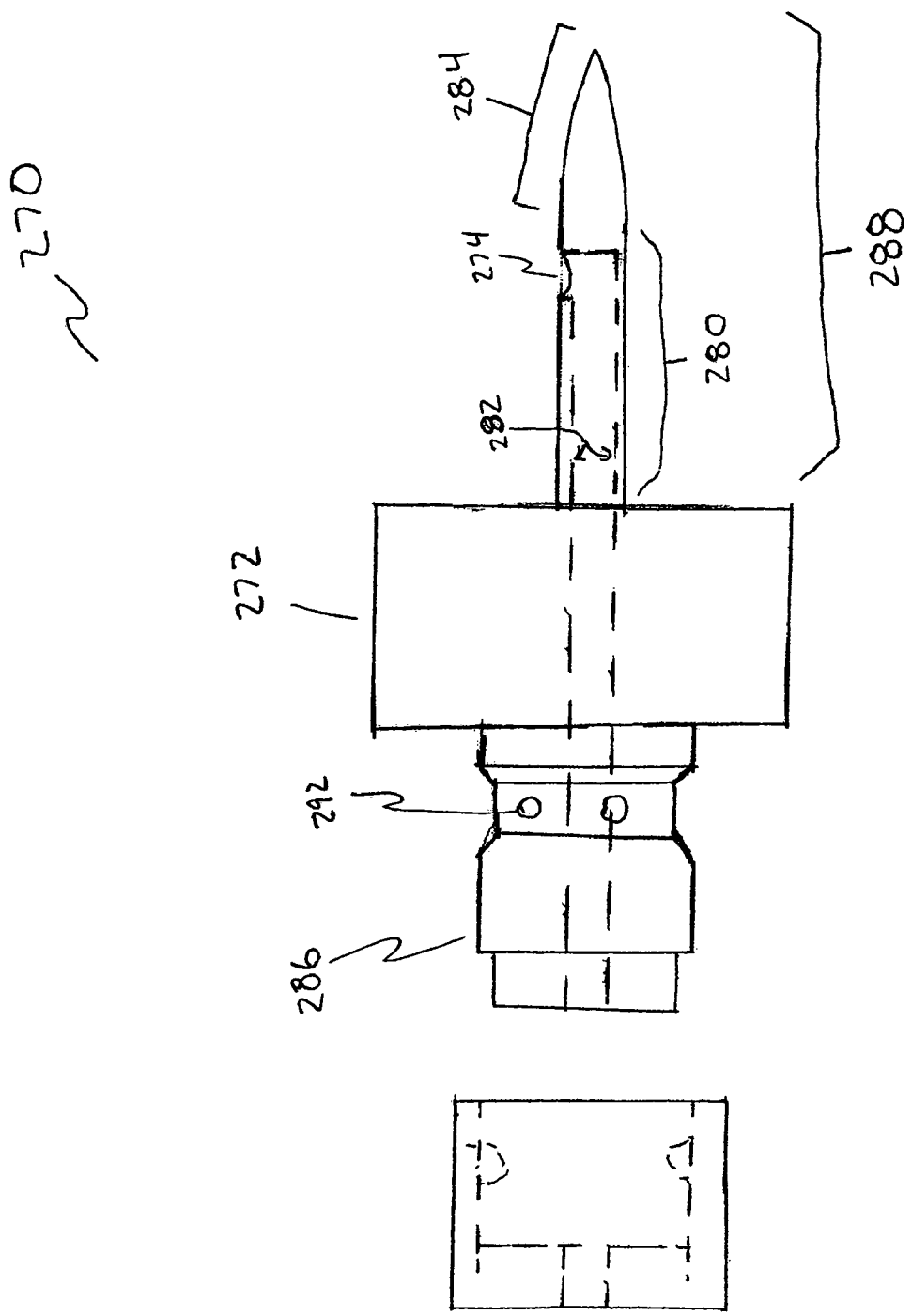
FIG. 5 shows a view of a third embodiment of an injector needle.

A third embodiment, shown by reference to FIGS. 1 and 5, utilizes a shortened highly sharpened injector needle 270, preferrably of high hardness stainless steel such as 17-4PH stainless steel. This embodiment is particularly suited for use on knotweed canes late in the season when the cane walls have become thick and tough due to loss of moisture. The shorter, hardened needle 270 is able to penetrate without risk of breaking. Needle 270 includes a quick connector 286, collar 272, and penetrator 288. Penetrator 288 includes fluid channel 282 within base 280 in communication with liquid dispenser 20 and fluid delivery aperture 274, and finely sharpened tip 284. Fluid delivery aperture 274 is located along base 280, distal from annular collar 272, in the range of 0.20 inches (5.8 mm) and 0.50 inches (12.7 mm), preferably approximately 0.400 inches (10.16 mm), to ensure delivery of herbicide into the hollow portion of the knotweed cane. Aperture 274 is in fluid communication with fluid dispensing system 20 through quich connector 286 and 290. Highly tapered sharpened tip 284 is used to penetrate tougher canes more easily, and because the risk of splitting the tougher cane stalks common late in the growing season is lessened. Collar 272 ensures proper positioning of aperture 274 within the late season cane stalk to deliver herbicide into the cavity. Male connector end 286 includes indents 292 which engage corresponding detents in the female connector end (not shown) to prevent needle 270 from rotating in relation to injector 20 during penetration and injection.

The cross section of penetrator 288 may be circular, oval, or may incorporate one or more flat edges including a polygonal shape such as triangular. Flat edges can be less expensive to manufacture and maintain, and may aid penetration because sharpening these edges creates new cutting surfaces, but care must be taken as this could also cause the cane to split.

Figure 6:
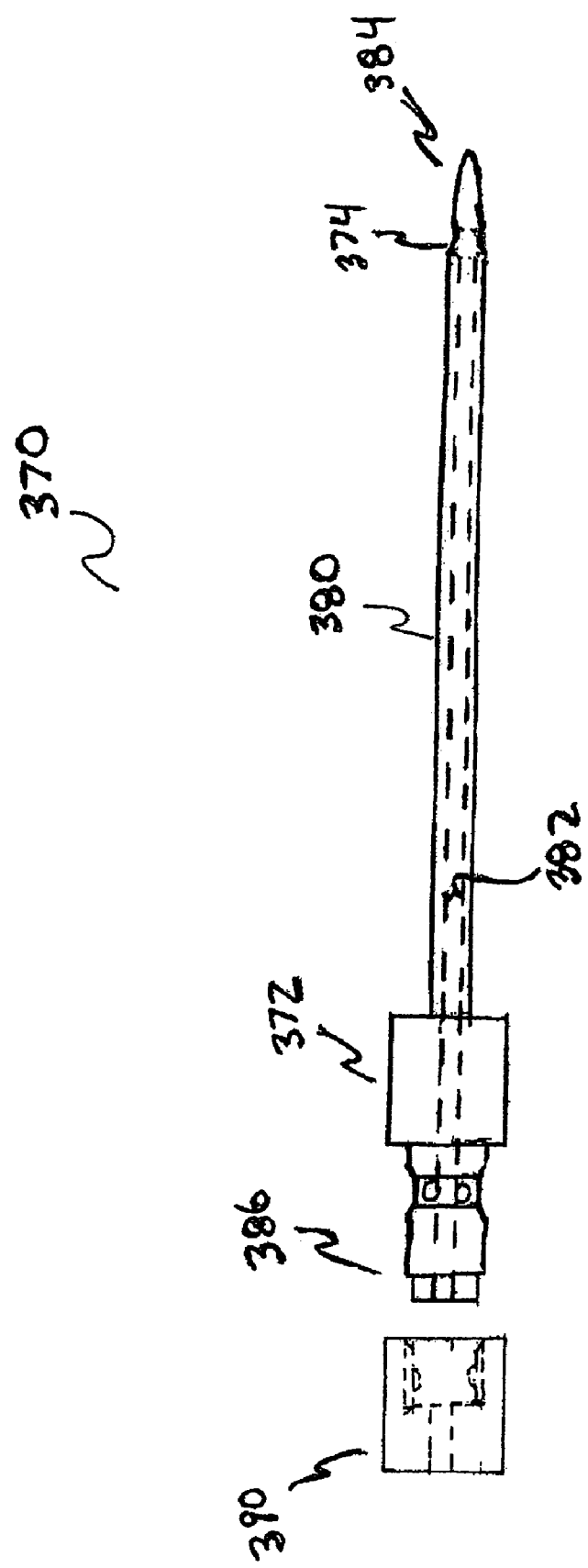
FIG. 6 shows a view of an fourth embodiment of an injector needle

A fourth embodiment, shown by reference to FIGS. 1 and 6, utilizes a cavity injector needle 370. Cavity injection needle 370 includes a quick connector 386, collar 372, straight shaft 380, and tapered blunted tip 384. Fluid dispensing aperture 374, located along the tapered portion of tip 384, is in fluid communication with liquid dispensing system 20 through channel 382, located within shaft 380, and quick connector 386. Shaft 380 has substantially uniform cross section from the shoulder of tip 384 to annular collar 372. Blunted tip 384 is designed for inserting axially into the open cavity of a cut knotweed cane, i.e. to penetrate into the from the top and through the internal wall of the stem joint. Fluid delivery aperture 374 is preferably a through hole providing two outlets 180 degrees separated. The cross section of cavity injector needle 370 is preferably circular, but any suitable cross section with sufficient area for channel 382 could be used.

In use, the cane stalk is cut much as in other cut stalk applications, but slightly above the second joint. Injector needle 370 is inserted from the cut opening through the interior wall separating the second and third cane segments, allowing herbicide to be injected into and retained in the cavity, rather than simply pouring herbicide into an cut stem segment as in prior cut stem application methods. The stout design of needle 370 and blunted round tip 384 allow the injector needle to penetrate through the stalk joint walls easily without snapping, especially late in the growing season when the stalk exterior walls become tough. Additionally, where old style cut stem applications are already in progress, the cavity injector needle embodiment is compatible. The cavity injector design is also effective for large-scale erradication efforts and long-term use without replacement due to dulling. The latteral location of the discharge port prevents plugging, and adding a second port ensures no blockage will occur.

The first through fourth embodiments, described above, may be combined into a single system by using injector needles with interchangeable connectors. Quick connectors are preferrable, but any suitable type may be used, including but not limited to: threaded; push-snap; compression; ferrul; sanitary; K-flange; or ¼ turn locking fittings. Other injector needle profiles with common connectors may also be used with this system as well.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A Japanese knotweed injector system for injecting a dose of weed-killing fluid into the stem of a Japanese knotweed, comprising:

a fluid dispenser system with a fluid passage;

a collared needle having connection means for connecting to said fluid passage, a base of constant cross section, with a fluid delivery aperture in communication with the fluid dispenser system disposed along said base in the range of 0.35 inches to 0.45 inches from said collar, a tapered shoulder extending from said base tapering from a first cross section matching said base to a second reduced cross section, a shaft extension of constant cross section extending from said tapered shoulder and matching said second reduced cross section, and a highly tapered blunted tip extending from said shaft extension, wherein said needle is dimensioned to pierce completely through the stem of a Japanese knotweed plant and said collar is positioned to place said aperture in the core of a Japanese knotweed stem to prevent blowback of the fluid; and, actuator means connected to the fluid dispenser system for actuating the transmission of fluid from the fluid dispenser system to the fluid delivery aperture, wherein said collared needle impales a Japanese knotweed stem, leaving said aperture in the interior of said Japanese knotweed.

2. The knotweed injection system of claim 1 wherein the termination point of said tapered shoulder is in the range of 0.35 inches (5.8 mm) to 0.55 inches (13.9 mm) from said collar.

3. The knotweed injection system of claim 1 wherein the aperture is approximately 0.030 inches (0.762 mm) in diameter.

4. The knotweed injection system of claim 1 wherein the point of said blunted tip has a radius of curvature of 0.005 inches (0.127 mm).

5. The knotweed injection system of claim 1 wherein the collar is substantially annular.

6. The knotweed injection system of claim 1 wherein the connection means are nonrotating quick-connectors.

7. The knotweed injection system of claim 1 wherein the highly tapered blunted tip of the needle incorporates a cross section with at least one flat edge.

8. The knotweed injection system of claim 1 wherein the highly tapered blunted tip of the needle cross section is substantially polygonal.

9. The knotweed injection system of claim 1 wherein the highly tapered blunted tip of the needle cross section is substantially circular.

10. The knotweed injection system of claim 1 wherein the injector needle is made from stainless steel.

11. The knotweed injection system of claim 1 wherein the injector needle is made from 17-4PH stainless steel.

12. The knotweed injection system of claim 1 wherein the connection means, collar, base, shoulder and tip are rigidly assembled by welding, pressing, stamping, or extrusion.

* * * * *